United States Patent
Zeng et al.

(10) Patent No.: US 10,523,917 B2
(45) Date of Patent: Dec. 31, 2019

(54) METHOD AND APPARATUS FOR ACQUIRING THREE-DIMENSIONAL IMAGE USING TWO CAMERAS

(71) Applicant: ArcherMind Technology (Nanjing) Co., Ltd., Nanjing (CN)

(72) Inventors: Guangrong Zeng, Nanjing (CN); Bin Du, Nanjing (CN)

(73) Assignee: ArcherMind Technology (Nanjing) Co., Ltd., Nanjing (CN)

(*) Notice: Subject to any disclaimer, the term of this patent is extended or adjusted under 35 U.S.C. 154(b) by 67 days.

(21) Appl. No.: 15/823,493

(22) Filed: Nov. 27, 2017

(65) Prior Publication Data
US 2019/0007675 A1    Jan. 3, 2019

(30) Foreign Application Priority Data
Jun. 29, 2017   (CN) .......................... 2017 1 0516187

(51) Int. Cl.
| | |
|---|---|
| *H04N 13/257* | (2018.01) |
| *H04N 13/25* | (2018.01) |
| *H04N 5/33* | (2006.01) |
| *G06K 9/20* | (2006.01) |
| *G06F 3/01* | (2006.01) |

(52) U.S. Cl.
CPC ........... *H04N 13/25* (2018.05); *G06K 9/2036* (2013.01); *H04N 5/33* (2013.01); *G06T 2207/10021* (2013.01); *G06T 2207/10024* (2013.01); *G06T 2207/10028* (2013.01); *H04N 13/257* (2018.05)

(58) Field of Classification Search
CPC ...... H04N 13/252; H04N 5/33; H04N 13/257; H04N 13/0271; G06K 9/2036; G06K 9/646; G06T 2207/10021; G06T 2207/10024; G06T 2207/10028; G06F 3/017
USPC ......... 348/254, 42, 47, 222.1; 382/154, 190, 382/195, 254, 277–308; 345/647, 646,
(Continued)

(56) References Cited

U.S. PATENT DOCUMENTS

| | | | | |
|---|---|---|---|---|
| 6,952,204 B2* | 10/2005 | Baumberg | ............. | G06T 17/10 345/420 |
| 8,452,081 B2* | 5/2013 | Wang | .................... | G06T 15/205 384/154 |

(Continued)

*Primary Examiner* — Marly S Camargo
(74) *Attorney, Agent, or Firm* — Hemisphere Law, PLLC; Zhigang Ma

(57) ABSTRACT

Disclosed are a method and apparatus for acquiring a three-dimensional image using two cameras. The method includes: acquiring image information of a target object using a first camera, and sending the acquired image information to an image signal processor; acquiring a phase grating image subjected to strip deformation in a picture space with an identical visual angle using a second camera, calculating depth data of the target object, and sending the depth data to the image signal processor; upon receipt of the image information and the depth data, if the image signal processor judges that the depth data is received, directly sending the depth data to a 3D image generating module, and if the image signal processor judges that the image information is received, performing routine image signal processing and sending the image information to the 3D image generating module; and synthesizing the depth data and the image information subjected to the image signal processing using the 3D image generating module to generate a 3D image.

6 Claims, 5 Drawing Sheets

(58) Field of Classification Search
USPC ........ 345/650, 653, 664, 679; 356/603, 602, 356/604; 702/152, 153
See application file for complete search history.

(56) References Cited

U.S. PATENT DOCUMENTS

| | | | |
|---|---|---|---|
| 8,844,802 B2* | 9/2014 | Fedorovskaya | G06K 19/00 235/375 |
| 2003/0231788 A1* | 12/2003 | Yukhin | G06K 9/00 382/115 |
| 2006/0033992 A1* | 2/2006 | Solomon | G02B 27/22 359/462 |
| 2010/0299103 A1* | 11/2010 | Yoshikawa | G01B 11/25 702/167 |
| 2013/0335535 A1* | 12/2013 | Kane | H04N 13/021 348/50 |
| 2017/0094243 A1* | 3/2017 | Venkataraman | G06T 2207/100 382/154 |
| 2017/0109888 A1* | 4/2017 | Lima | G06T 7/0024 382/154 |
| 2018/0113593 A1* | 4/2018 | Ng | G06F 3/04815 715/771 |

* cited by examiner

101

Acquire image information of a target object using a first camera, and send the acquired image information to an image signal processor

102

Acquire a phase grating image subjected to strip deformation in a picture space with an identical visual angle using a second camera, calculate depth data of the target object, and send the depth data to the image signal processor

103

Upon receipt of the image information and the depth data, if the ISP judges that the depth data is received, directly send the depth data to a 3D image generating module, and if the ISP judges that the image information is received, perform routine image signal processing and send the image information to the 3D image generating module

104

Synthesize the depth data and the image information subjected to the image signal processing using the 3D image generating module to generate a 3D image

FIG. 1

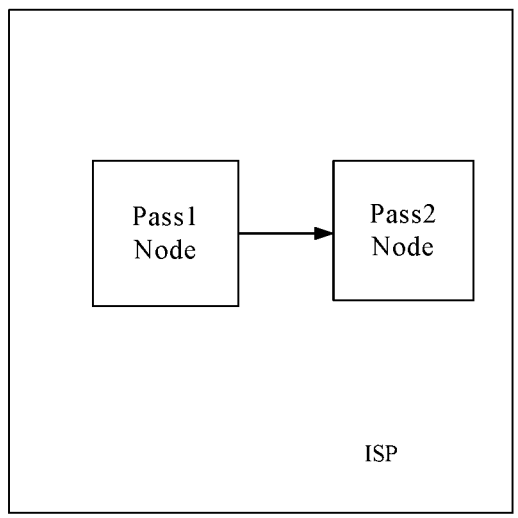

FIG. 2

METHOD AND APPARATUS FOR ACQUIRING THREE-DIMENSIONAL IMAGE USING TWO CAMERAS

This application is based upon and claims priority of Chinese Patent Application No. 201710516187.4, filed before Chinese Patent Office on Jun. 29, 2017 and entitled "METHOD AND APPARATUS FOR ACQUIRING THREE-DIMENSIONAL IMAGE USING TWO CAMERAS", the entire contents of which are incorporated herein by reference.

TECHNICAL FIELD

The present invention relates to a method and apparatus for acquiring a three-dimensional image, and in particular, relates to a method and apparatus for acquiring a three-dimensional image using two cameras.

BACKGROUND

With rapid development of smart phones, differences between the smart phones are becoming smaller and smaller. The smart phones have similar configurations, and similar appearance designs. Therefore, the smart phones need some "new functions" to re-draw attention of users. Analysis of user preferences of the users reveals that in addition to the basic call-making and Internet surfing functions, the users frequently use the cameras. Configuration of front or rear two cameras are being welcomed and recognized by the smart phone manufacturers and users. The photos picked up by the two cameras have high resolution, better noise control, a better dynamic range and more accurate depth data, and thus well populated among the users.

Photographing three-dimensional (3D) photos and videos using two cameras is a future development trend, and the users photograph the 3D photos and videos directly using the two cameras of the mobile phones and implement more applications and scenarios, for example, virtual reality (VR), augmented reality (AR), image identification and measurement and the like.

At present, some mobile phones are configured with two cameras on the same side (for example, front or rear two cameras). Two photos are simultaneously acquired using a first camera and a second camera, wherein one is a colored photo and the other is a gray-scale photo. Data reconstructed is performed for the gray-scale photo using the super-pixel synthesis algorithm to obtain depth data, and then a 3D photo is generated via simulation based on the colored image and the depth data using the 3D algorithm.

However, in the prior art, since the photographed photo does not carry any depth data, and the depth data obtained via simulation using the super-pixel synthesis algorithm is not sufficiently accurate. Consequently, the synthesized 3D content is subjected to distortion, and is not a real 3D image.

SUMMARY

To overcome the defects in the prior art, the present invention is intended to provide a method and apparatus for acquiring a three-dimensional image using two cameras, so as to improve the quality of photos and videos picked up by the two cameras.

To achieve the above objectives, the present invention provides the following technical solutions:

The present invention provides a method for acquiring a three-dimensional image using two cameras. The method includes the following steps:

acquiring image information of a target object using a first camera, and sending the acquired image information to an image signal processor;

acquiring a phase grating image subjected to strip deformation in a picture space with an identical visual angle using a second camera, calculating depth data of the target object, and sending the depth data to the image signal processor;

upon receipt of the image information and the depth data, if the image signal processor judges that the depth data is received, directly sending the depth data to a 3D image generating module, and if the image signal processor judges that the image information is received, performing routine image signal processing; and synthesizing the depth data and the image information subjected to the image signal processing using the 3D image generating module to generate a 3D image.

Further, the step of acquiring a phase grating image subjected to strip deformation in a picture space with an identical visual angle using a second camera and calculating depth data of the target object further includes:

projecting a phase grating structured light to the picture space with the identical visual angle using a structured light emitting unit;

acquiring a phase grating image subjected to strip deformation upon projection of the phase grating structured light using the second camera;

demodulating the phase grating image subjected to strip deformation to obtain a phase variation comprising depth information, and calculating the depth data of the target object using a quasi-optical trigonometric function.

Further, the projecting a phase grating structured light to the picture space with the identical visual angle using a structured light emitting unit includes: projecting the phase grating structured light to the picture space with the identical visual angle using a laser diode module on the second camera.

Further, the second camera is a universal RGB camera; and prior to the acquiring a phase grating image subjected to strip deformation upon projection of the phase grating structured light using the second camera, the method further includes:

setting an operation mode of the second camera to an IR grayscale mode.

Further, the image information and the depth data are respectively sent to the image signal processor via two MIPI interfaces, or the image information and the depth data are encapsulated and sent to the image signal processor via one MIPI interface.

Further, in the method, photographing synchronization and frame synchronization are controlled using an I²C communication bus.

To achieve the above objectives, the present invention further provides an apparatus for acquiring a three-dimensional image using two cameras. The apparatus includes:

an image information acquiring module, configured to acquire image information of a target object using a first camera, and send the acquired image information to an image signal processor;

a depth data generating module, configured to acquire a phase grating image subjected to strip deformation in a picture space with an identical visual angle using a second camera, calculate depth data of the target object, and send the depth data to the image signal processor;

an image signal processor, configured to, upon receipt of the image information or the depth data, if it is judged that the depth data is received, directly send the depth data to a 3D image generating module, and if it is judged that the image information is received, perform routine image signal processing and send the image information to the 3D image generating module; and a 3D image generating module, configured to synthesize the depth data and the image information subjected to the image signal processing to generate a 3D image.

Further, the depth data generating module further includes:

a structured light emitting unit, configured to project a phase grating structured light to the picture space with the identical visual angle;

a phase grating image acquiring unit, configured to acquire a phase grating image subjected to strip deformation upon projection of the phase grating structured light using the second camera; and a depth data calculating unit, configured to demodulate the phase grating image subjected to strip deformation to obtain a phase variation comprising depth information, and calculate the depth data of the target object using a quasi-optical trigonometric function.

Further, the structured light emitting unit is further configured to project the phase grating structured light to the picture space with the identical visual angle using a laser diode module on the second camera.

Further, the second camera employs a universal RGB camera whose operation mode is set to IR grayscale mode.

Further, the image information acquired by the image information acquiring module and the depth data acquired by the depth data generating module are respectively sent to the image signal processor via two MIPI interfaces, or the image information acquired by the image information acquiring module and the depth data acquired by the depth data generating module are encapsulated and sent to the image signal processor via one MIPI interface.

Further, in the apparatus, photographing synchronization and frame synchronization are controlled using an $I^2C$ communication bus.

Compared with the prior art, the method and apparatus for acquiring three-dimensional image using two cameras have the following beneficial effects:

In the method and apparatus for acquiring a three-dimensional image using two cameras according to the present invention, by using an image processing function of a bypass image signal processor acquiring depth data, the depth data and image information picked up by another camera are 3D synthesized, and photographing synchronization and frame synchronization are controlled using an $I^2C$ communication bus, thereby implementing real-time and high-fidelity 3D photos and videos. The present invention is applicable to various photographing environments, including a scenario of nightscape, a scenario containing moving objects and the like. The present invention implements 3D double-photographing method on such mobile terminals as mobile phones, tablets, televisions, smart vehicles, VR, AR and unmanned aircraft systems based on bypass ISP and double-photographing frame synchronization.

BRIEF DESCRIPTION OF THE DRAWINGS

FIG. 1 is a flowchart of a method for acquiring a three-dimensional image using two cameras according to an embodiment of the present invention;

FIG. 2 is a function and schematic flowchart of an image signal processor;

DETAILED DESCRIPTION

Figure 3:
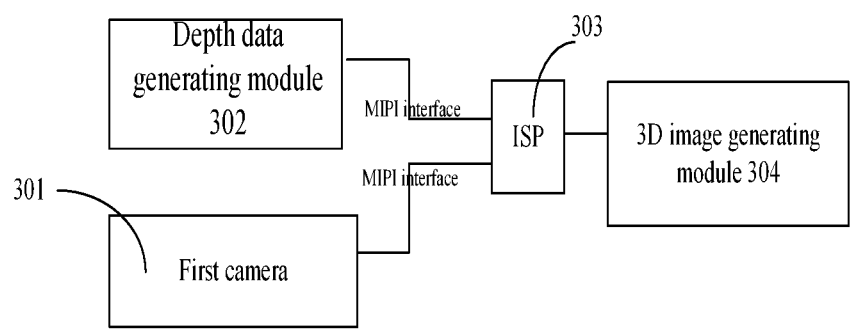
FIG. 3 is a schematic structural diagram of a system for acquiring a three-dimensional image using two cameras according to an embodiment of the present invention.

For clearer description of the technical solutions in the embodiments of the present invention or the prior art, the specific embodiments of the present invention are described hereinafter with reference to the accompanying drawings. Apparently, the accompanying drawings described hereinafter only illustrate some embodiments of the present invention. Persons of ordinary skill in the art would derive other accompanying drawings and other embodiments based on these accompanying drawings, without paying any creative effort.

For brevity, parts relevant to the present invention are merely illustrated in the drawings, and these parts do not denote the actual structure of the product. In addition, for brevity and ease of understanding, with respect to parts having the same structure or function in the drawings, only one of these parts is illustratively drawn in the drawings, or only one of these parts is marked. In this context, "a" or "one" does not merely denotes "only one" but may also denote "more than one".

In one embodiment of the present invention, as illustrated in FIG. 1, the present invention provides a method for acquiring a 3D image using two cameras. The method includes the following steps:

Step 101: Image information of a target object is acquired using a first camera, and the acquired image information is sent to an image signal processor.

Step 102: A phase grating image subjected to strip deformation in a picture space with an identical visual angle is acquired using a second camera, depth data of the target object is calculated, and the depth data is sent to the image signal processor.

Specifically, step 102 further includes:

Step S1: A phase grating structured light to the picture space with the identical visual angle is projected using a structured light emitting unit, that is, highly stable laser in an infrared waveband, wherein the grating is modulated on the surface of the object due to the depth such that strip deformation is caused. Specifically, the structured light emitting unit may be a laser diode module (LDM) on a camera.

Step S2: A phase grating image subjected to strip deformation upon projection of the phase grating structured light is acquired using the second camera. In a specific embodiment of the present invention, the second camera may reuse the conventional general RGB camera. However, before use, the infrared filter needs to be disabled using a voice coil motor microcontroller, such that a fully transmittable spectrum filter starts working, and thus a camera sensor receives infrared rays. That is, the working mode of the RGB camera is set to IR grayscale mode, such that the camera acquires the phase grating image subjected to strip deformation on the surface the a target object.

Step S3: The phase grating image subjected to strip deformation is demodulated to obtain a phase variation comprising depth information, and the depth data of the target object is calculated using a quasi-optical trigonometric function.

In a specific embodiment of the present invention, the image information of the target object acquired using the first camera and the depth data of the target object are respectively sent to an image signal processor (ISP) on a system-on-chip (SoC) of a mobile phone, or the image information and the depth data are encapsulated and then sent to the ISP on the SoC of the mobile phone via one MIPI interface.

Step 103: Upon receipt of the image information and the depth data, if the ISP judges that the depth data is received, the depth data is directly sent to a 3D image generating module, and if the ISP judges that the image information is received, routine image signal processing is performed and the image information is sent to the 3D image generating module In the conventional hardware design of the mobile phone, an ISP is generally built on the SoC of the mobile phone, and the image picked up by each camera is sent to the ISP via the MIPI interface. The ISP performs white balancing, denoising, edge distortion and shaping and the like operations for the initial image, and then provides the processed image data to a next module for previewing and recording. The function of the ISP built on a primary chip and flowchart thereof are as illustrated in FIG. 2. Pass 1 Node is responsible for performing a canvas size adjustment, a format conversion and the like for the image signal, and Pass 2 Node is responsible for performing white balancing, denoising, exposure adjustment for the image information and identifying face and the like information in the image. However, such a mechanism may destroy the depth data from a gray-scale camera, and consequently the rear end fails to synthesize with the data from a RGB camera to form a 3D photo or image. Therefore, the image processing function of enabling the acquired depth data to bypass the ISP in this step prevents the depth data from being destroyed.

Step 104: The depth data and the image information subjected to the image signal processing are synthesized using the 3D image generating module to generate a 3D image. Specifically, the 3D image generating module 304 performs 3D modeling using the depth data, and renders the colored image to a 3D model based on picture frame synchronization serial numbers, thereby implementing synthesis of a 3D image or video.

In a specific embodiment of the present invention, in step 104, the ISP receives the image data and the depth data via two MIPI interfaces (MIPI 0 and MIPI 1) respectively, enables the determined depth data to bypass processing by Pass 1 and Pass 2, and directly uploads the data via callback using the DataCallBack function to the rear end or the function OnPreviewFrame on an upper-layer application, such that the rear end or the upper-layer application acquires the transparently transmitted depth data. The transparent transmission herein refers to a data transmission manner that is irrelevant to the media, modulation and demodulation mode, transmission mode and transport protocol in a transport network, but the present invention is not limited to such transparent transmission manner. The determined image information is subjected to the processing by Pass 1 and Pass 2 of the Pass 1 Node and Pass 2 Node, including canvas size adjustment, format conversion and the like operation for the image information, and white balancing, denoising, exposure adjustment and the like operation for the image information. The data is uploaded via callback using the DataCallBack function to the rear end or the function OnPreviewFrame on the upper-layer application. That is, in this embodiment, the 3D image generating module is configured at the rear end or on the upper-layer application, synthesis of the image information and the depth data is implemented at the rear end or the upper-layer application, but the present invention is not limited to such configuration and implementation.

Apparently, according to the present invention, by means of the image processing function of enabling the acquired depth data to bypass the ISP, the depth data and the image information acquired by the RGB camera (the first camera) are synthesized, or the depth data is transparently transmitted to the rear end or the upper-layer application, and hence is synthesized with the image data acquired by the by the RGB camera (the first camera). In addition, photographing synchronization and frame synchronization are controlled using an I$^2$C communication bus, thereby implementing photographing of the 3D photos and videos.

In another embodiment of the present invention, as illustrated in FIG. 3, a system for acquiring a three-dimensional image using two cameras according to the present invention includes: an image information acquiring module 301, a depth data generating module 302, an image signal processor (ISP) 303, and a 3D image generating module 304.

The image information acquiring module 301 is configured to acquire image information of a target object. In a specific embodiment of the present invention, the image information acquiring module 301 is practiced by a first camera, wherein the first camera may be an ordinary RGB camera. The depth data generating module 302 is configured to acquire a phase grating image subjected to strip deformation in a picture space with an identical visual angle using a second camera, calculate depth data of the target object. The ISP 303 is configured to, upon receipt of the image information or the depth data, if it is judged that the depth data is received, directly send the depth data to a 3D image generating module, and if it is judged that the image information is received, perform routine image signal processing and send the image information to the 3D image generating module. The 3D image generating module 304 is configured to synthesize the depth data and the image information subjected to the image signal processing to generate a 3D image. Specifically, the 3D image generating module 304 performs 3D modeling using the depth data, and renders the colored image to a 3D model based on picture frame synchronization serial numbers, thereby implementing synthesis of a 3D image or video.

Figure 4:
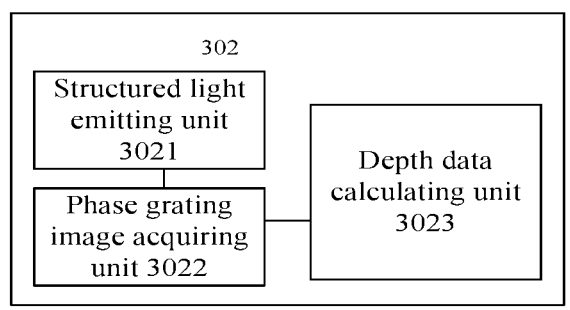
FIG. 4 is a structural diagram illustrating details of a depth data generating module according to a specific embodiment of the present invention.

Specifically, as illustrated in FIG. 4, the depth data generating module 302 further includes:

a structured light emitting unit 3021, configured to project a phase grating structured light to the picture space with a visual angle the same as that of the first camera, that is, highly stable laser in an infrared waveband, wherein the grating is modulated on the surface of the object due to the depth such that strip deformation is caused; specifically, the structured light emitting unit may be a laser diode module (LDM) on the camera;

a phase grating image acquiring unit 3022, configured to acquire a phase grating image subjected to strip deformation using the second camera; wherein in a specific embodiment of the present invention, the second camera may reuse the conventional general RGB camera; however, before use, the infrared filter needs to be disabled using a voice coil motor microcontroller, such that a fully transmittable spectrum filter starts working, and thus a camera sensor receives infrared rays; that is, the working mode of the RGB camera is set to IR grayscale mode, such that the camera acquires the phase grating image subjected to strip deformation on the surface the a target object;

a depth data calculating unit 3023, configured to demodulate the phase grating image subjected to strip deformation to obtain a phase variation comprising depth information, and calculate the depth data of the target object using a quasi-optical trigonometric function.

Figure 5:
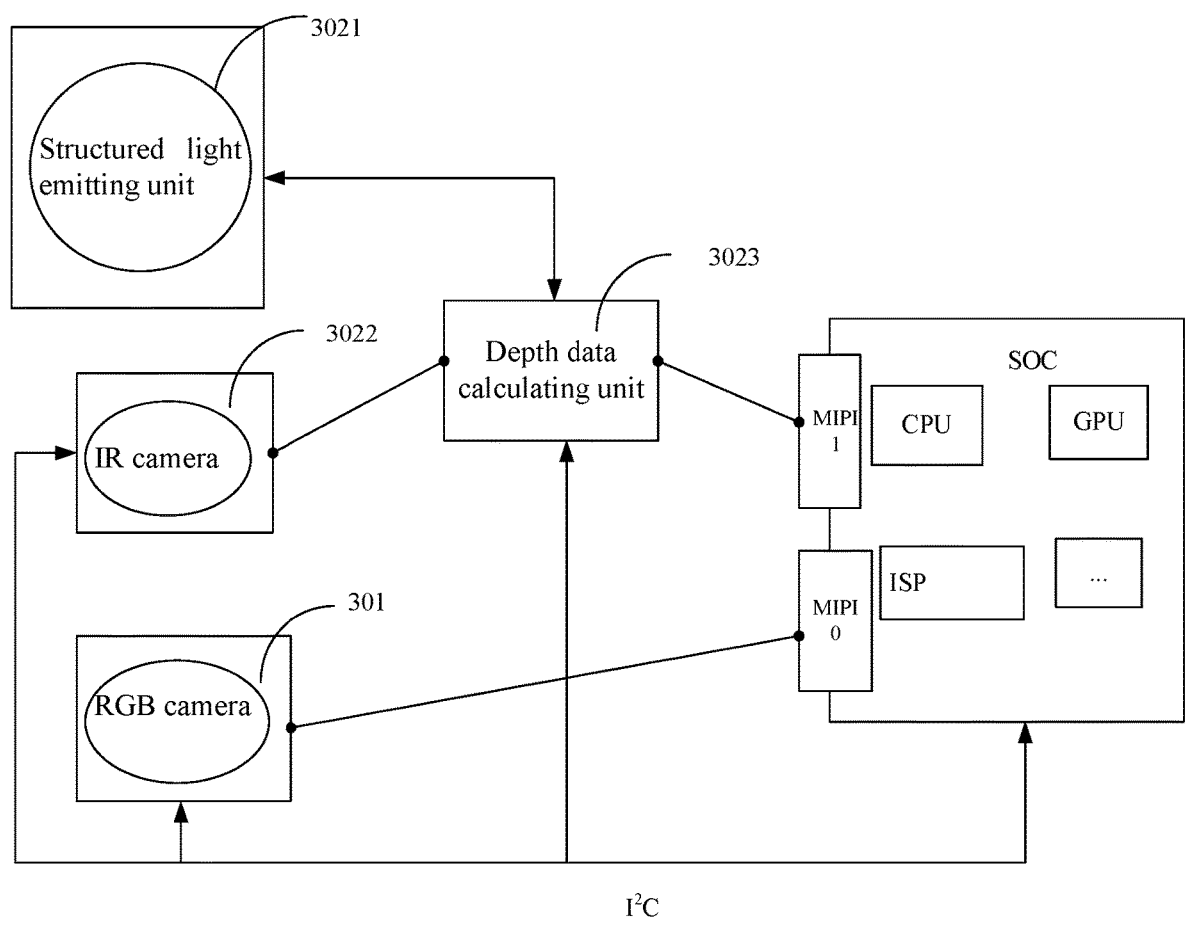
FIG. 5 is a design block diagram of a two-camera hardware employing separated MIPI channels according to an embodiment of the present invention.
Figure 6:
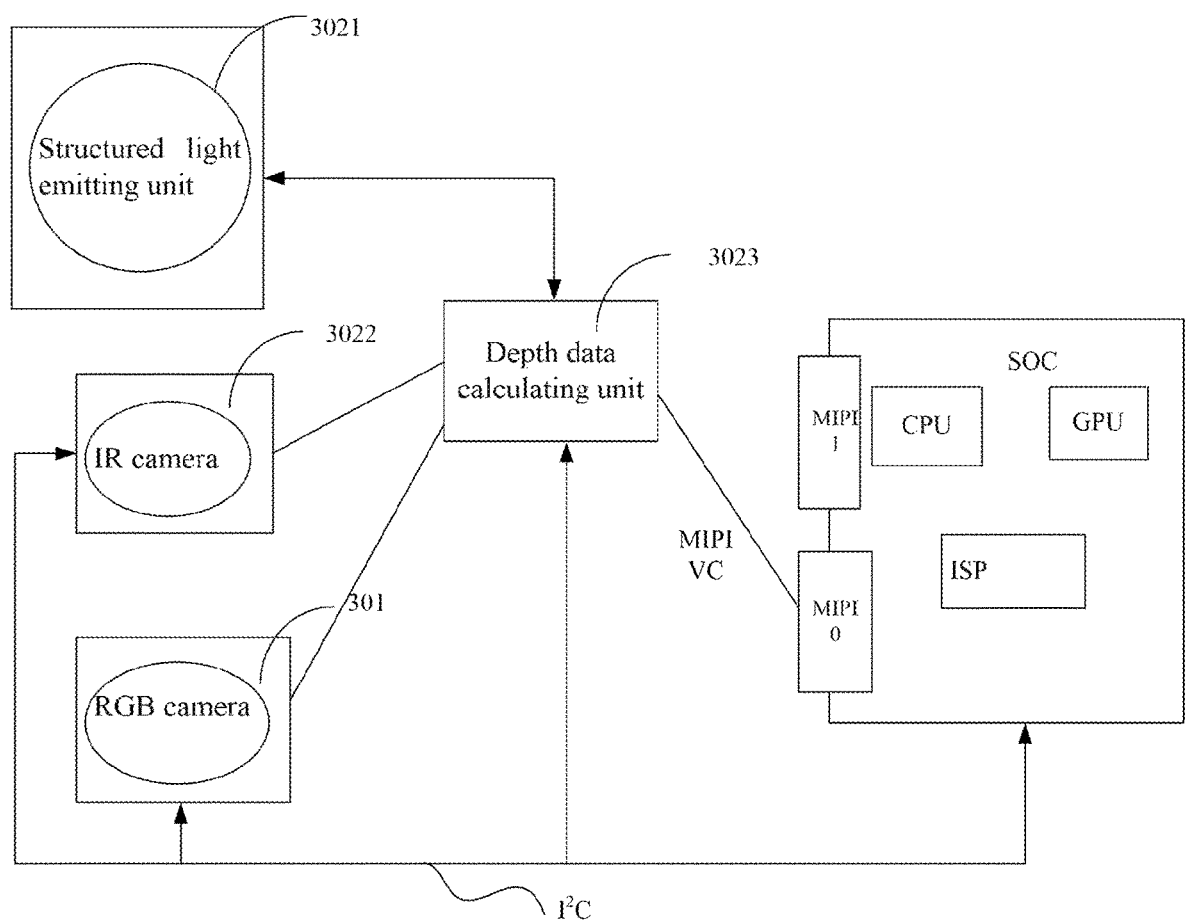
FIG. 6 is a design block diagram of a two-camera hardware employing MIPI virtual channels according to an embodiment of the present invention.

In a specific embodiment of the present invention, acquires the image information of the target object acquired by the image information acquiring module 301 using an RGB camera, that is, a first camera, and the depth data of the target object generated by the phase grating image subjected to strip deformation acquired by the depth data generating module 302 according to an infrared (IR) camera may be respectively sent to an ISP on a SoC via two MIPI interfaces (MIPI 0 and MIPI 1) as illustrated in FIG. 5, or are encapsulated and then sent to the ISP on the SoC via one MIPI interface as illustrated in FIG. 6.

Figure 7:
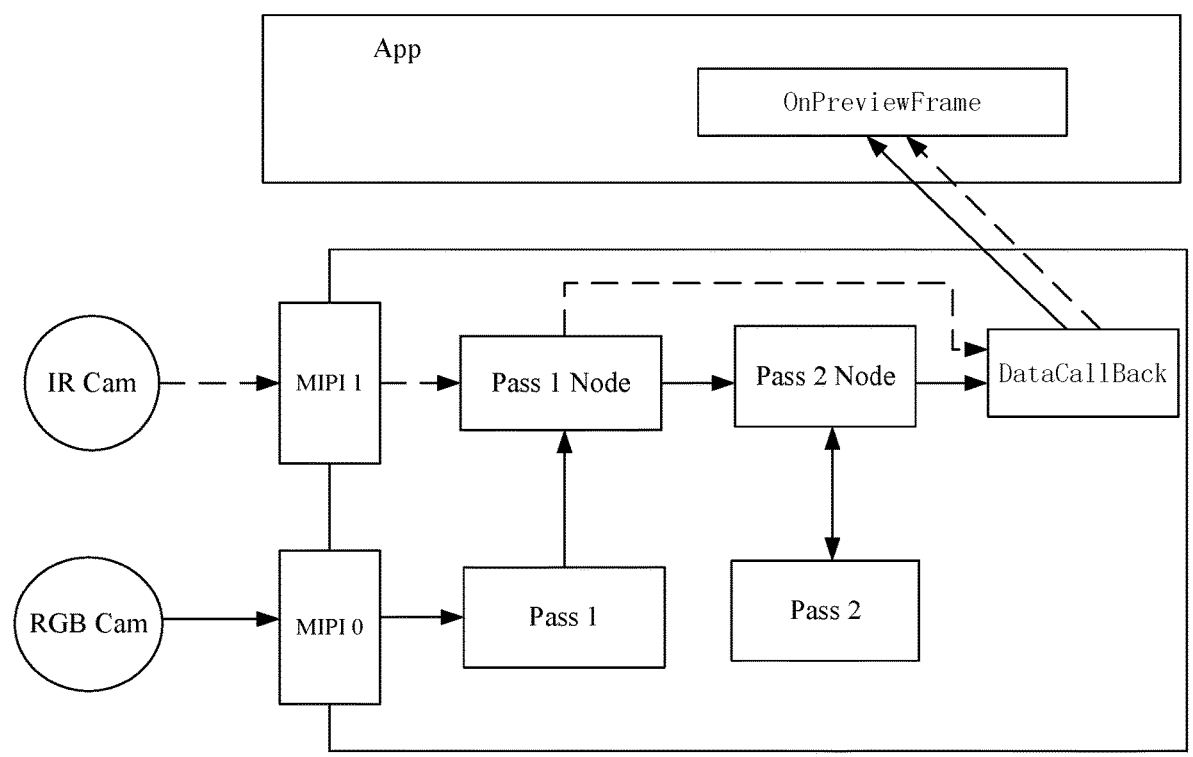
FIG. 7 is a schematic diagram of bypass ISP and transparently transmitted depth data according to an embodiment of the present invention.

In a specific embodiment of the present invention, the ISP 303 enables the depth data acquired by the IR camera to bypass processing by Pass 1 and Pass 2 through Pass 1 Node and Pass 2 Node, the data is directly uploaded to the OnPreviewFrame function on an upper-layer application end via callback using the DataCallBack function. In this way, the upper-layer application end acquires the depth data that is transparently transmitted. As illustrated by the dotted lines in FIG. 7, the 3D image generating module is arranged on the rear end or the upper layer application, synthesis of the image information and the depth data is completed at the rear end or on the upper-layer application. The image information acquired by the RGB camera is subjected to processing by Pass 1 and Pass 2 of Pass 1 Node and Pass 2 Node, including canvas size adjustment, format conversion and the like operation for the image information, and white balancing, denoising, exposure adjustment and the like operation for the image information. Afterwards, the data is uploaded to the OnPreviewFrame function via callback using the DataCallBack function, as illustrated by the solid lines in FIG. 7. The specific process is as illustrated in FIG. 7.

Specifically, the specific service logic code of the ISP portion according to the present invention is implemented as follows:

Step 0: One mutual exclusion lock and one buffer pointer are initialized at a first node Pass 1 Node of a first passage Pass 1 of the ISP.

Step 1: One mutual exclusion lock, one buffer pointer and one SetIRisAddr function are initialized at a second node Pass 2 Node of a second passage Pass 2.

Step 2: The SaveIRis function is defined in the first node Pass 1 Node.

Step 3: Data to be sent to the first passage Pass 1 is sent the ptrbuff pointer in a first passage Pass 1 structure body via the SaveIRis function interface.

Step 4: The ReadIRisAddrfunction is defined in the second node Pass 2 Node.

Step 5: Data in the IRisRead Buff is subjected to a 10-bit-to-8-bit conversion via the ReadIRisAddr functioin interface and a 90-degree rotation, and then sent to the output of the second Pass 2.

Step 6: The setIRisAddr function of the second passage Pass 2 is called, the IRisRead pointer is directed to the mpIRisBuffer and the IRisLock pointer is directed to the MIRisLockMtx, to achieve buffer address sharing between the first passage Pass 1 and the second passage Pass 2.

Step 7: The data is directly uploaded to the OnPreviewFrame function of the App via callback using the DataCallBack function.

Step 8: Depth/gray-scale data and colored data are synthesized at the App end.

Step 9: The App at a camera client previews and records the synthesized data.

In conclusion, in the method and apparatus for acquiring a three-dimensional image using two cameras according to the present invention, by using an image processing function of a bypass image signal processor acquiring depth data, the depth data and image information picked up by another camera are 3D synthesized, and photographing synchronization and frame synchronization are controlled using an I²C communication bus, thereby implementing real-time and high-fidelity 3D photos and videos. The present invention is applicable to various photographing environments, including a scenario of nightscape, a scenario containing moving objects and the like. The present invention implements 3D double-photographing method on such mobile terminals as mobile phones, tablets, televisions, smart vehicles, VR, AR and unmanned aircraft systems based on bypass ISP and double-photographing frame synchronization.

Compared with the related art, the present invention has the following advantages:

1. The present invention is based on the solution of single ISP of a conventional control chip, and thus no additional ISP is desired to be interconnected to the IR camera. In this way, the design cost of the smart terminals is lowered.

2. The method of acquiring the depth data using a bypass ISP according to the present invention has high adaptability. Where 3D photographing is not desired, the second camera responsible for acquiring the depth data may normally acquire colored images. In this way, the resolution, frame ratio and quality of the photos and videos acquired by two cameras are improved.

It should be noted that the above embodiments may be freely combined according to actual needs. Described above are preferred examples of the present invention. It should be noted that persons of ordinary skill in the art may derive other improvements or polishments without departing from the principles of the present invention. Such improvements and polishments shall be deemed as falling within the protection scope of the present invention.

What is claimed is:

1. A method for acquiring a three-dimensional image using two cameras, comprising the following steps:

acquiring image information of a target object using a first camera, and sending the acquired image information to an image signal processor;

acquiring a phase grating image subjected to strip deformation in a picture space with an identical visual angle using a second camera, calculating depth data of the target object, and sending the depth data to the image signal processor;

when the image signal processor judges that the depth data is received, directly sending the depth data to a 3D image generating module, and when the image signal processor judges that the image information is received, performing routine signal processing and sending the image information to the 3D image generating module; and synthesizing the depth data and the image information subjected to the image signal processing using the 3D image generating module to generate a 3D image.

2. The method for acquiring a three-dimensional image using two cameras according to claim 1, wherein the step of acquiring a phase grating image subjected to strip deformation in a picture space with an identical visual angle using a second camera and calculating depth data of the target object comprises:

projecting a phase grating structured light to the picture space with the identical visual angle using a structured light emitting unit;

acquiring a phase grating image subjected to strip deformation upon projection of the phase grating structured light using the second camera;

demodulating the phase grating image subjected to strip deformation to obtain a phase variation comprising depth information, and calculating the depth data of the target object using a quasi-optical trigonometric function.

3. The method for acquiring a three-dimensional image using two cameras according to claim 2, wherein the projecting a phase grating structured light to the picture space with the identical visual angle using a structured light emitting unit comprises: projecting the phase grating structured light to the picture space with the identical visual angle using a laser diode module on the second camera.

4. The method for acquiring a three-dimensional image using two cameras according to claim 2, wherein the second camera is a universal RGB camera; and prior to the acquiring a phase grating image subjected to strip deformation upon projection of the phase grating structured light using the second camera, the method further comprises:

setting an operation mode of the second camera to an IR grayscale mode.

5. The method for acquiring a three-dimensional image using two cameras according to claim 1, wherein the image information and the depth data are respectively sent to the image signal processor via two MIPI interfaces, or the image information and the depth data are encapsulated and sent to the image signal processor via one MIPI interface.

6. The method for acquiring a three-dimensional image using two cameras according to claim 1, wherein photographing synchronization and frame synchronization are controlled using an I2C communication bus.

* * * * *